(12) United States Patent
Wang et al.

(10) Patent No.: US 8,820,947 B2
(45) Date of Patent: Sep. 2, 2014

(54) PROJECTION APPARATUS WITH LOCKING STRUCTURE

(75) Inventors: Yun-Sheng Wang, Hsin-Chu (TW); Chia-Tien Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 203 days.

(21) Appl. No.: 13/398,859

(22) Filed: Feb. 17, 2012

(65) Prior Publication Data
US 2013/0027677 A1 Jan. 31, 2013

(30) Foreign Application Priority Data

Jul. 29, 2011 (CN) .......................... 2011 1 0220381

(51) Int. Cl.
G03B 21/14 (2006.01)
(52) U.S. Cl.
CPC .................................. G03B 21/145 (2013.01)
USPC ................. 353/119; 353/79; 353/94; 353/99; 353/122; D16/221; D16/225
(58) Field of Classification Search
USPC .......... 353/79, 94, 99, 119, 122; 248/11, 137, 248/175; 348/743–747; 349/5, 7–9; D16/203, 213, 221, 225, 229, 230–231, D16/234–235
See application file for complete search history.

(56) References Cited

U.S. PATENT DOCUMENTS

| | | | |
|---|---|---|---|
| 4,043,685 A | 8/1977 | Hyams | |
| 5,743,614 A * | 4/1998 | Salerno et al. | 353/122 |
| 6,623,123 B2 * | 9/2003 | Eguchi et al. | 353/30 |
| 7,152,440 B1 * | 12/2006 | Austin | 70/58 |
| 7,246,908 B2 * | 7/2007 | Salvatori et al. | 353/69 |
| 7,641,348 B2 * | 1/2010 | Yin et al. | 353/119 |
| 8,087,790 B2 * | 1/2012 | Nakanishi et al. | 353/119 |
| 2005/0168707 A1 * | 8/2005 | Feldpausch et al. | 353/79 |
| 2009/0051887 A1 | 2/2009 | Chen et al. | |
| 2010/0123882 A1 * | 5/2010 | Inoue et al. | 353/119 |
| 2011/0168589 A1 * | 7/2011 | Wang et al. | 206/316.1 |

FOREIGN PATENT DOCUMENTS

| | | |
|---|---|---|
| CN | 101408713 | 4/2009 |
| CN | 201514536 | 6/2010 |
| CN | 102056430 | 5/2011 |
| CN | 102129156 | 7/2011 |
| TW | I327624 | 5/2009 |

OTHER PUBLICATIONS

"Office Action of China Counterpart Application", issued on Jun. 3, 2014, pp. 1-6.

* cited by examiner

Primary Examiner — Sultan Chowdhury
(74) Attorney, Agent, or Firm — Jianq Chyun IP Office

(57) ABSTRACT

A projection apparatus with locking structure includes an apparatus case including a main casing, a lid and at least one locking structure at the main casing and the lid, a light source, a light valve and a lens. The structure includes a slot having two opposite ends at the casing, at-least one elastic arm in the slot and at-least one positioning pillar at the lid. When the lid covers the main casing and the pillar extends into the first end, by rotating the lid relatively to the main casing, the pillar moves along the slot to the second end; when the pillar is at the second end, the elastic arm limits the pillar at the second end. The light source is for providing an illumination beam. The light valve and lens are for respectively converting the illumination beam into an image beam and the image beam into a projection beam.

14 Claims, 9 Drawing Sheets

PROJECTION APPARATUS WITH LOCKING STRUCTURE

CROSS-REFERENCE TO RELATED APPLICATION

This application claims the priority benefit of China application serial no. 201110220381.0, filed on Jul. 29, 2011. The entirety of the above-mentioned patent application is hereby incorporated by reference herein and made a part of this specification.

BACKGROUND OF THE INVENTION

1. Field of the Invention

The invention generally relates to a projection apparatus and more particularly, to a projection apparatus with locking structure.

2. Description of Related Art

The projection apparatus is a display device for projecting a large-size image. In the projection apparatus, an illumination beam produced by a light source is converted into an image beam through a light valve and then the image beam is converted into a projection beam through a projection lens which further is projected onto a screen or a wall so as to complete imaging and displaying. Along with the great progress of the projection technique and the reduced manufacturing cost, the application of a projection apparatus has been expanded from a commercial use to a domestic use.

No matter a projection apparatus or other kind of electronic apparatus needs an apparatus case to protect and shield the components thereof, in which the apparatus case usually is formed by assembling a plurality of casings. In terms of the apparatus case of a projection apparatus, the casings of the apparatus case are fixed mostly by hooking-up of locking hooks, so that multiple sets of locking hooks must be respectively positioned correspondingly to certain targets for smoothly assembling, which however results in inconvenience. In addition, an apparatus case assembled by hooking-up of locking hooks can be easily detached by a user and it causes the casings separated from each other.

U.S. Pat. No. 4,043,685 discloses a fastening structure being able to fasteningly combine an upper cover with a lower cover. Taiwan Patent No. 327624 discloses a locking device for connecting components and sub-assemblies to a projection apparatus and preventing the components and the sub-assemblies from separating off.

SUMMARY OF THE INVENTION

Accordingly, the invention is directed to a projection apparatus with locking structure in which an apparatus case thereof could be easily assembled and avoiding a user from arbitrarily detaching.

Other objectives and advantages of the invention should be further indicated by the disclosures of the invention, and omitted herein for simplicity.

To achieve one of, a part of or all of the above-mentioned advantages, or to achieve other advantages, an embodiment of the invention provides a projection apparatus with locking structure, which includes an apparatus case, a light source, a light valve and a lens. The apparatus case includes a main casing, a lid and at least one locking structure disposed at the main casing and the lid. The locking structure includes at least one slot and at least one elastic arm both disposed at the main casing. The main casing has a groove. The slot is formed at a bottom surface of the groove and the lid is embedded in the groove of the main casing. The elastic arm is located in the slot. The slot has a first end and a second end opposite to the first end. The locking structure includes at least one positioning pillar disposed at the lid. The positioning pillar has a position-limiting portion disposed in one end thereof. An inner diameter of the first end of the slot is greater than or equal to an outer diameter of the position-limiting portion and an inner diameter of the second end of the slot is less than the outer diameter of the position-limiting portion. When the lid covers the main casing and the positioning pillar correspondingly extends into the first end of the slot, the lid rotates relatively to the main casing and brings the positioning pillar to simultaneously move along the slot to the second end. When the positioning pillar is located at the second end, the elastic arm of the corresponding slot makes the positioning pillar being positioningly limited and leaned against the second end for avoiding a separation between the lid and the main casing. The light source is disposed in the main casing of the apparatus case for providing an illumination beam. The light valve is disposed in the apparatus case for converting the illumination beam into an image beam. The lens is disposed in the main casing of the apparatus case for converting the image beam into a projection beam.

The elastic arm of the locking structure further has a retaining bump. The positioning pillar capable of pushing away the retaining bump during moving along the corresponding slot by withstanding an elastic force of the elastic arm so as to move to the second end. When the positioning pillar is located at the second end, the retaining bump leans against the positioning pillar for preventing the positioning pillar from moving away from the second end along the corresponding slot. In addition, the retaining bump has a guiding slope and the positioning pillar pushes away the retaining bump by a guiding function of the guiding slope.

The number of the at least one elastic arm of the locking structure is two and the two elastic arms extend out respectively from two opposite inner walls of the slot.

In the above-mentioned projection apparatus with locking structure, the number of the at least one slot is two. The two slots are arc-shaped and respectively have a corresponding curvature center and two curvature radii are of the same length. The number of the at least one positioning pillar is two. The number of the at least one elastic arm is multiple and the elastic arms are respectively located in the two slots. When the lid covers the main casing and the two positioning pillars respectively and correspondingly extend into the two first ends, the lid is capable of rotating relatively to the main casing and bringing each of the positioning pillars to simultaneously move along the corresponding slot to the corresponding second end. When the two positioning pillars are respectively located at the two second ends, the elastic arms of the two slots respectively make the two positioning pillars being positioningly limited at the two second ends for avoiding the separation between the lid and the main casing.

In the above-mentioned projection apparatus with locking structure, the number of the at least one slot is one, and the number of the at least one positioning pillar is two. The locking structure further includes an opening disposed at the main casing. When the lid covers the main casing and the two positioning pillars respectively extend into the first end of the slot and the opening, the lid is capable of rotating relatively to the main casing around the positioning pillar extending into the opening as an axis so as to bring the other positioning pillar to simultaneously move along the slot to the second end. The elastic arm positioningly limits the corresponding positioning pillar at the second end of the slot.

Based on the description above, in the above-mentioned embodiment of the invention, when the positioning pillars respectively extend into the slots of the main casing, only one operation of rotating the lid relatively to the main casing could bring each of the positioning pillars to simultaneously move along the corresponding slot and to be positioningly limited by the elastic arms, which makes assembling the apparatus case more convenient. In addition, when the lid follows the above-mentioned operation to be rotated relatively to the main casing and arrives at a target position by assembling, by the position-limiting function of each of the elastic arms on the positioning pillar, the lid is unable to be reversely rotated to separate from the main casing, which avoids a user to arbitrarily detach the lid from the main casing.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
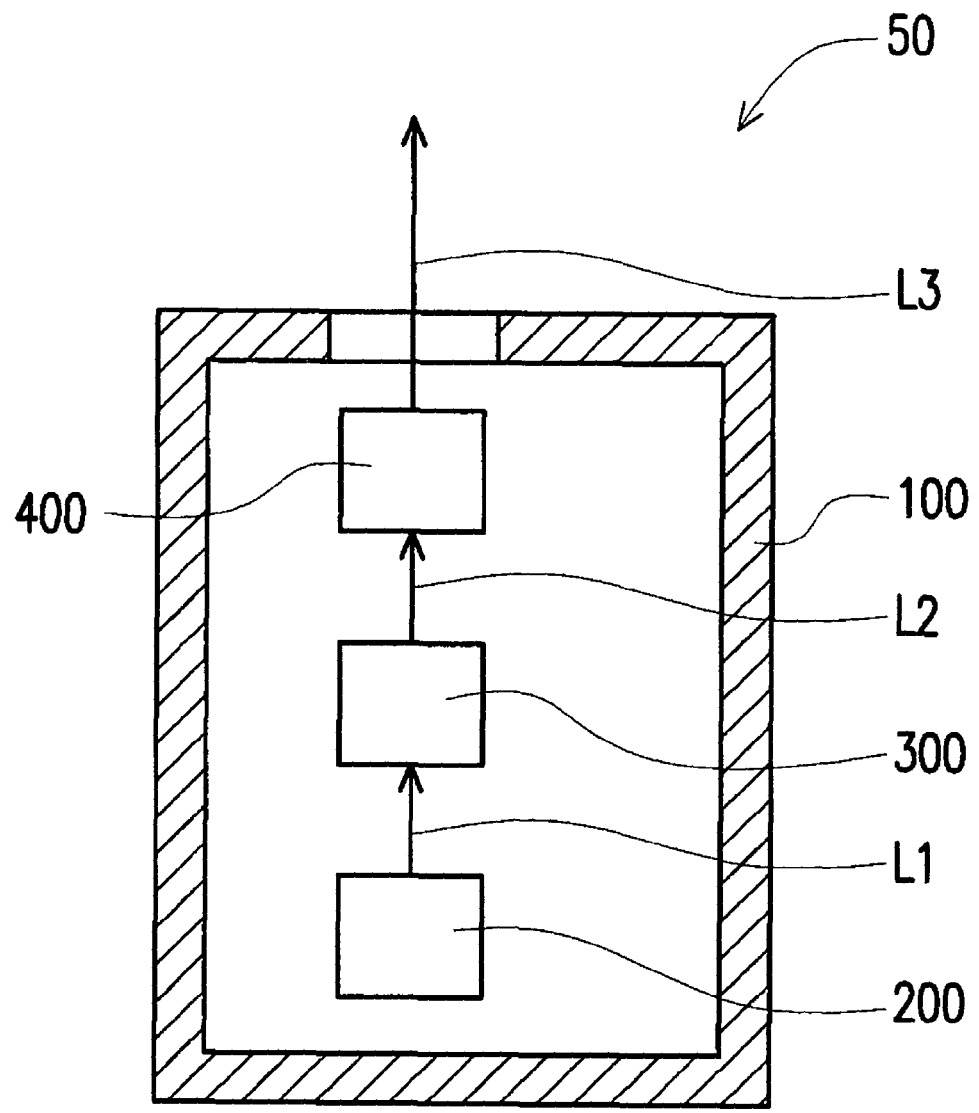
FIG. 1 is a schematic diagram of a projection apparatus according to an embodiment of the invention.

FIG. 1 is a schematic diagram of a projection apparatus according to an embodiment of the invention. Referring to FIG. 1, a projection apparatus 50 of the embodiment includes an apparatus case 100, a light source 200, a light valve 300 and a lens 400. The light source 200 is disposed in the apparatus case 100 for providing an illumination beam L1. The light valve 300 is disposed in the apparatus case 100 for converting the illumination beam L1 into an image beam L2. The lens 400 is disposed in the apparatus case 100 for converting the image beam L2 into a projection beam L3, followed by projecting the beam L3 onto a screen or a wall outside the apparatus case 100 to form an image (not shown).

Figure 2:
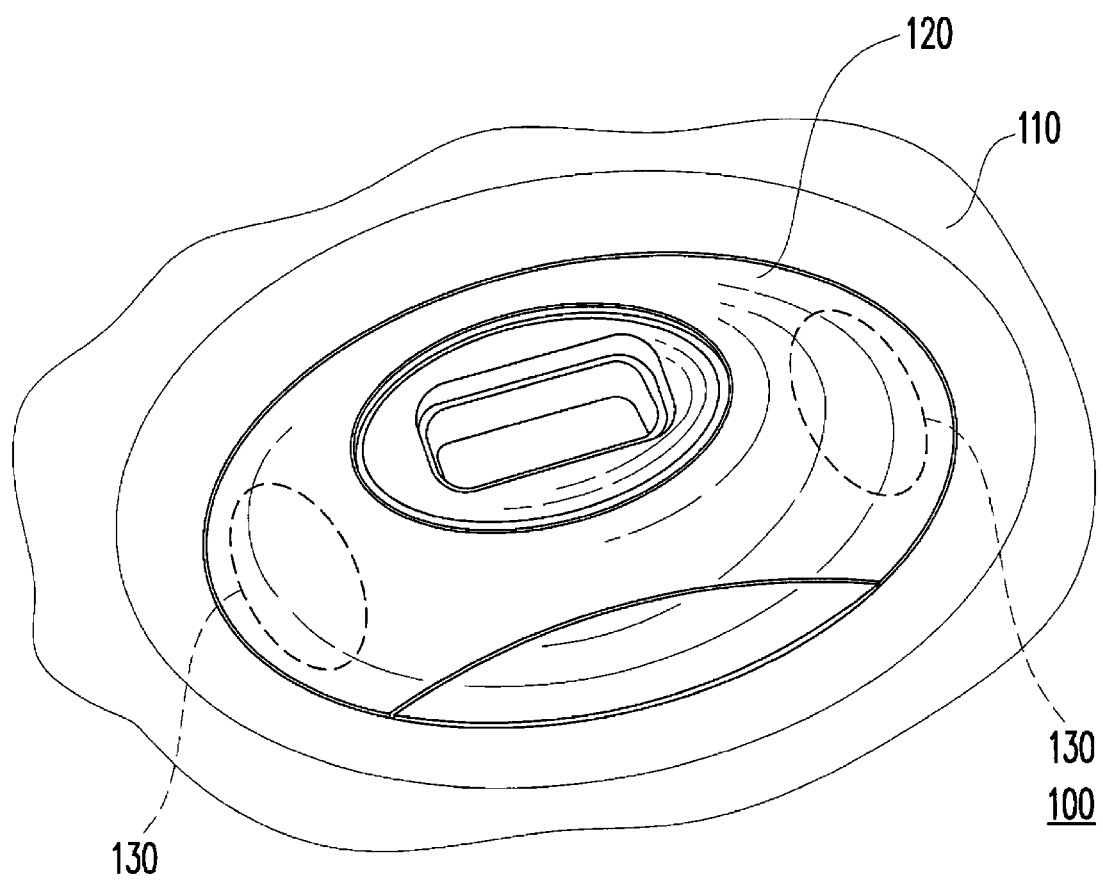
FIG. 2 is a partially 3-dimensional diagram of the apparatus case of FIG. 1.
Figure 3:
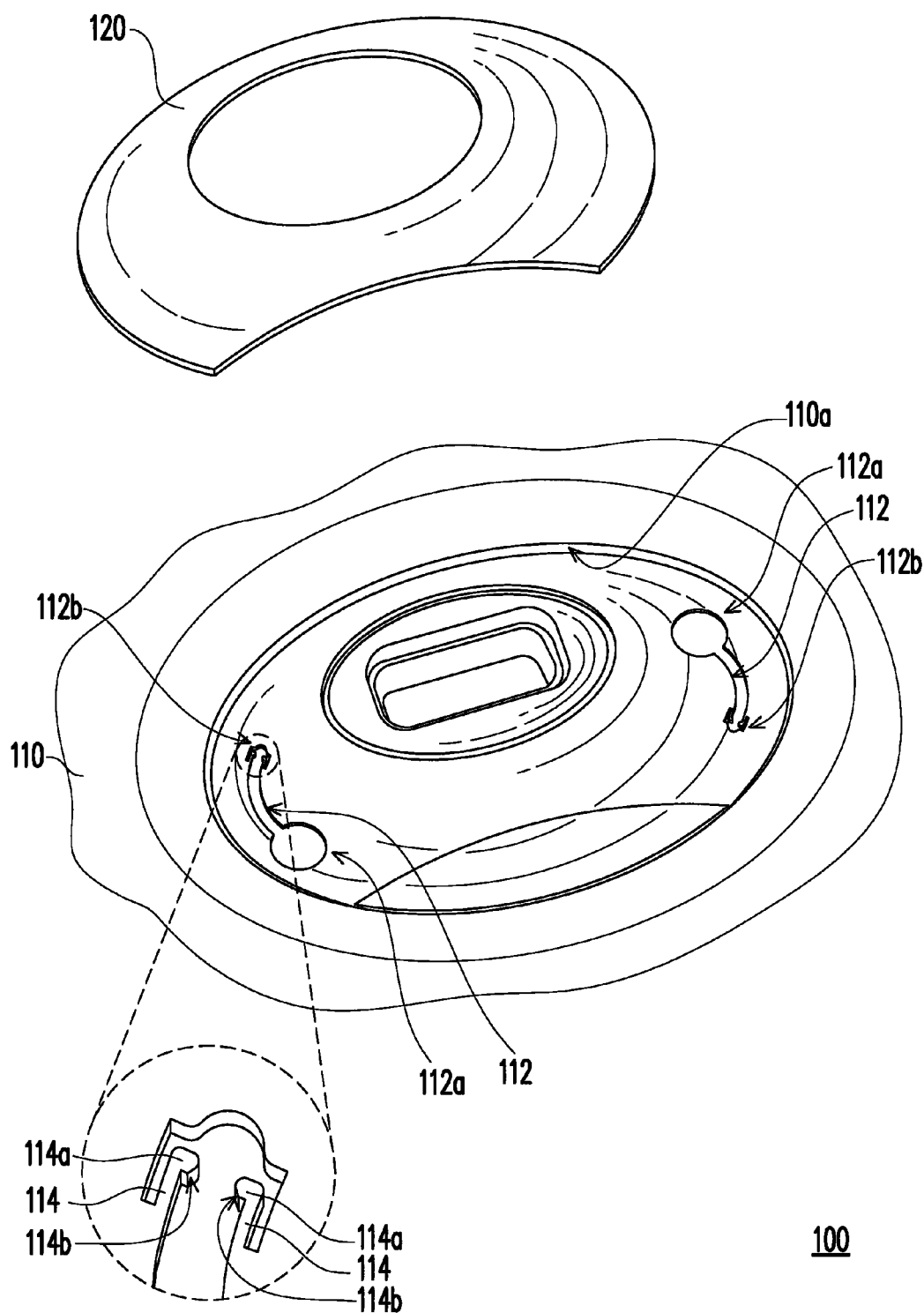
FIG. 3 is an exploded schematic diagram of the apparatus case of FIG. 2.
Figure 4:
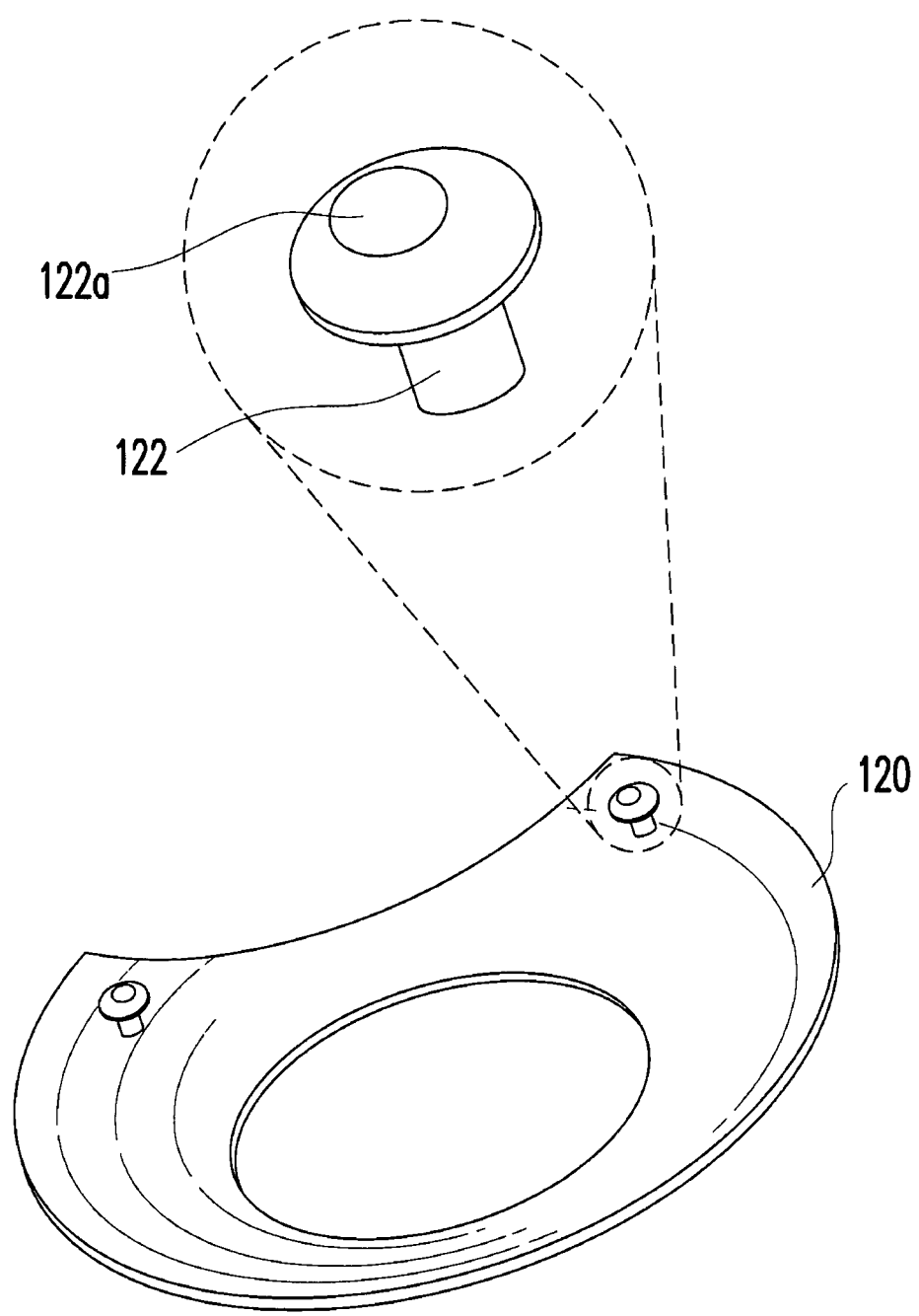
FIG. 4 is a 3-dimensional diagram of the lid of FIG. 3 in another aspect of view.

Referring FIGS. 2-4, the apparatus case 100 of the embodiment includes a main casing 110, a lid 120 and two locking structure 130 disposed at the main casing 110 and the lid 120. Each of the locking structure 130 includes a slot 112 and multiple elastic arms 114 both disposed at the main casing 110, in which the elastic arms 114 are respectively located at two opposite inner walls of the slot 112. Each of the slots 112 includes a first end 112a and a second end 112b opposite to the first end 112a, and Each of the locking structure 130 includes a positioning pillar 122 disposed at a bottom surface of the lid 120.

Figure 5A:
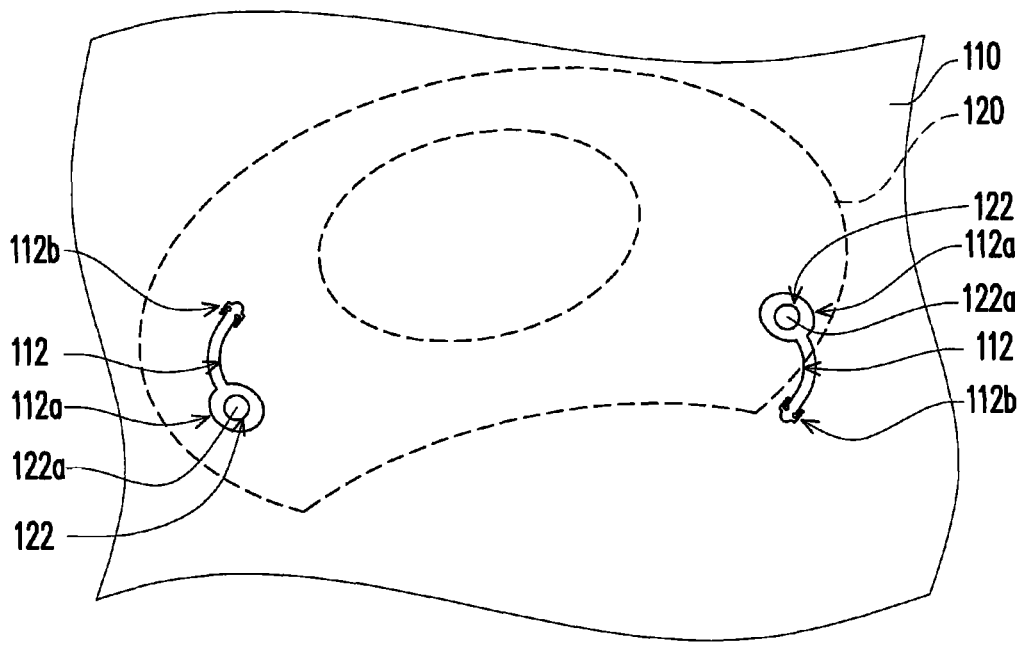
FIG. 5A is a bottom view diagram showing two positioning pillars of FIG. 3 respectively extend into two slots.
Figure 5B:
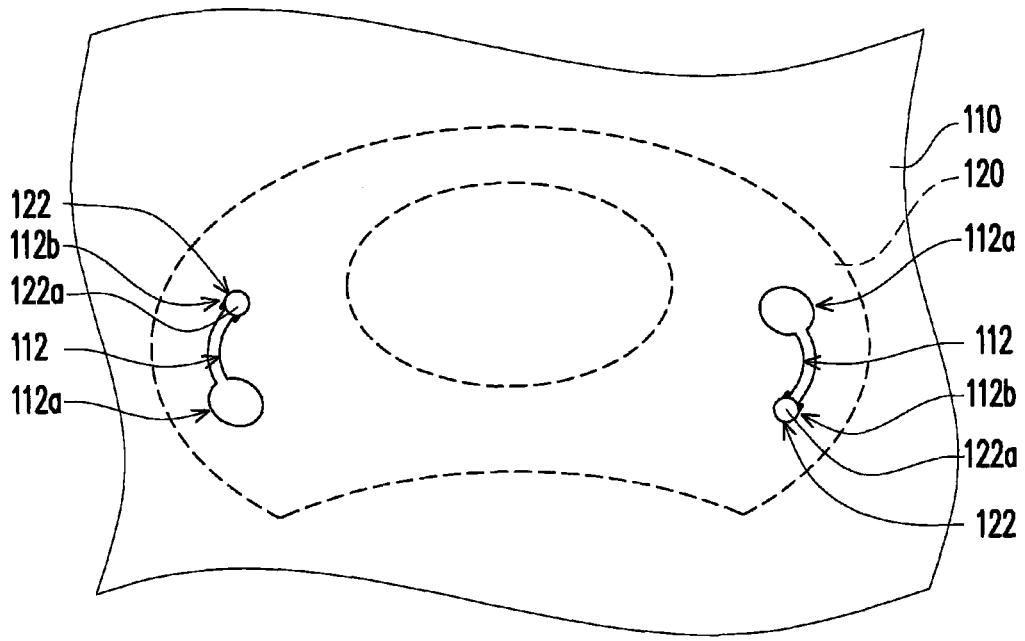
FIG. 5B is a bottom view diagram showing the two positioning pillars of FIG. 5A respectively move to the second end of each of the two slots.
Figure 6:
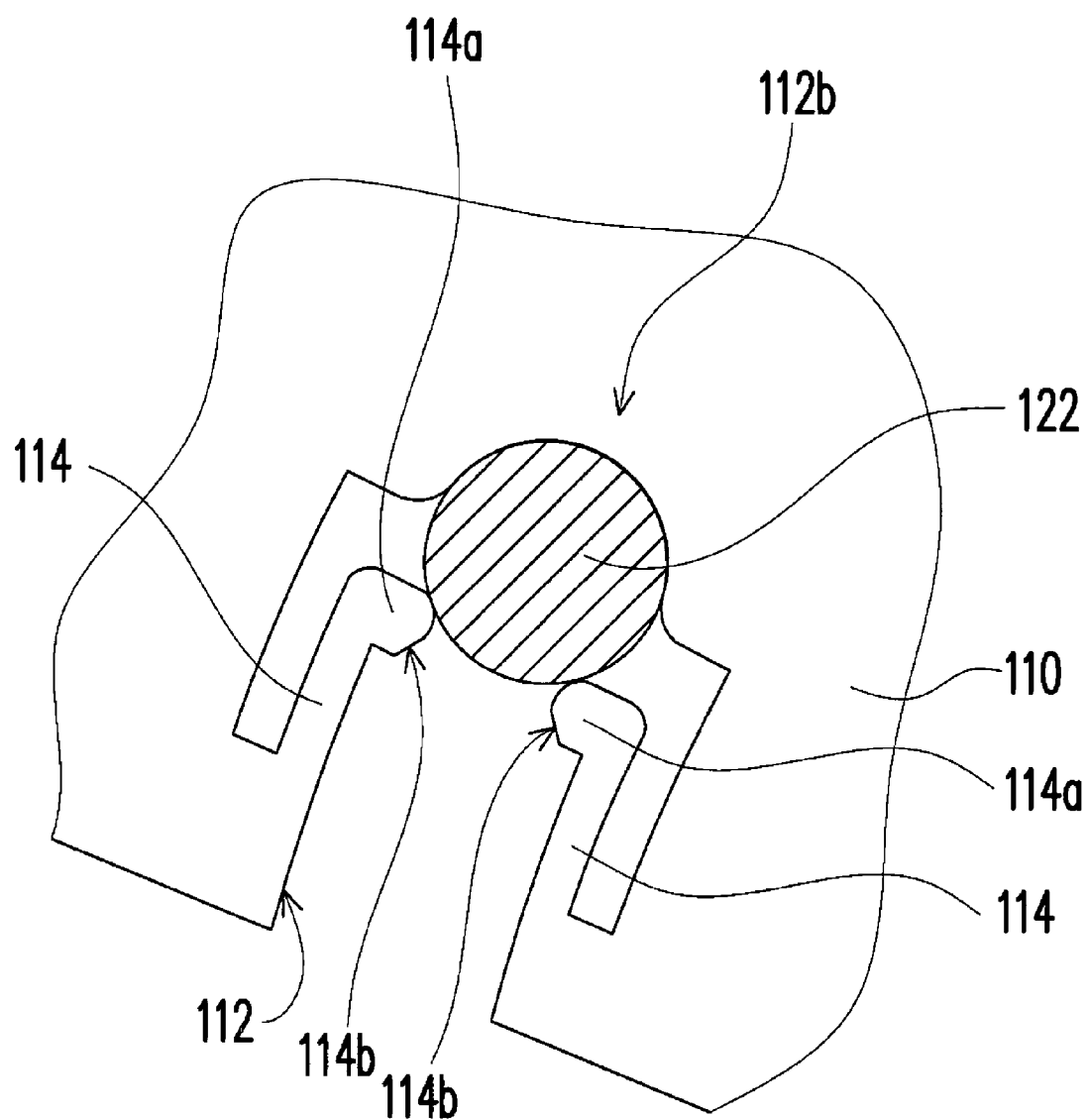
FIG. 6 is a partial diagram showing one of the positioning pillars of FIG. 5B is positioningly limited at the second end of the slot by two elastic arms.

Referring to FIGS. 5A, 5B and 6, when the lid 120 covers the main casing 110 and the two positioning pillars 122 respectively extend into the two first ends 112a of the two slots 112 as shown by FIG. 5A, the lid 120 could rotate relatively to the main casing 110 to the position as shown by FIG. 5B so as to bring the two positioning pillars 122 simultaneously moving to the corresponding second ends 112b along the corresponding slots 112. When the two positioning pillars 122 are respectively located at the two second ends 112b, the elastic arms 114 disposed in the inner walls of the slots 112 would respectively limit the position of each of the two positioning pillars 122 at the second end 112b of the corresponding slot 112.

Under the above-mentioned layout, when the two positioning pillars 122 of the lid 120 respectively extend into the two slots 112 of the main casing 110, each of the positioning pillars 122 could move along the corresponding slots 112 to be positioningly limited by the elastic arms 114 merely by rotating the lid 120 relatively to the main casing 110, so that the operation of assembling the apparatus case 100 is more simple and handy. In addition, when the lid 120 follows the above-mentioned operation and is rotated relatively to the main casing 110 to arrive at a target position by assembling, by the position-limiting and leaning function of each of the elastic arms 114 on the positioning pillar 122, the lid 120 is unable to be reversely rotated to separate from the main casing 110, which avoids a user to arbitrarily detach the lid 120 from the main casing 110.

In the embodiment, the two slots 112 are arc-shaped and respectively have a corresponding curvature center and two curvature radii of the two slots 112 are of the same length, so that when the two positioning pillars 122 of the lid 120 respectively extend into the two first ends 112a of the main casing 110, each of the two positioning pillars 122 could rotate relatively to the main casing 110 around the corresponding curvature center as a rotation center. In addition, as shown by FIG. 3, the main casing 110 of the embodiment has a groove 110a for correspondingly receiving the lid 120, and the two slots 112 are formed at a bottom surface of the groove 110a. The two positioning pillars 122 respectively correspond to two locations of the slots 112. When the lid 120 is assembled with the main casing 110 and arrives at the target position, the lid 120 would be embedded in the groove 110a to further limit the position of the lid 120. As a result, the lid 120 and the main casing 110 could be tightly locked by each other.

In the embodiment, the number of the elastic arms is four, two of the elastic arms respectively extend out from the two opposite inner walls of one slot 112, while the rest two elastic arms 114 respectively extend out from the two opposite inner walls of the other slot 112. Referring to FIGS. 3 and 6, one end of each elastic arm 114 is connected to the corresponding inner wall of the corresponding slot 112, while the other end thereof has a retaining bump 114a formed thereon. During the positioning pillars 122 move to the second ends 112b of the slots 112, the positioning pillars 122 would push away the retaining bumps 114a by withstanding the elastic force of the elastic arms 114 so as to move to the second ends 112b, and when the positioning pillars 122 are located at the second ends 112b, the retaining bumps 114a lean against the positioning pillars 122 for preventing the positioning pillars 122 from moving away from the second ends 112b along the slots 112. In more details, each of the retaining bumps 114a has a guiding slope 114b and the positioning pillars 122 push away the retaining bumps 114a by the guiding function of the guiding slopes 114b.

Referring to FIGS. 3 and 4, in the embodiment, each of the positioning pillars 122 has a position-limiting portion 122a disposed in one end thereof. An inner diameter of each of the first ends 112a of the slots 112 is greater than or equal to an outer diameter of the position-limiting portion 122a so that the position-limiting portion 122a of the positioning pillar 122 could pass through the first end 112a. In addition, an inner diameter of each of the second ends 122b of the slots 112 is less than the outer diameter of the position-limiting portion 122a so that when the positioning pillar 122 is located at the second end 112b, the position-limiting portion 122a is unable to move from the second end 112b of the slot 112, such that the positioning pillar 122 could be locked and fixed by the structure interference between the position-limiting portion 122a and the second end 112b of the main casing 110.

Figure 7:
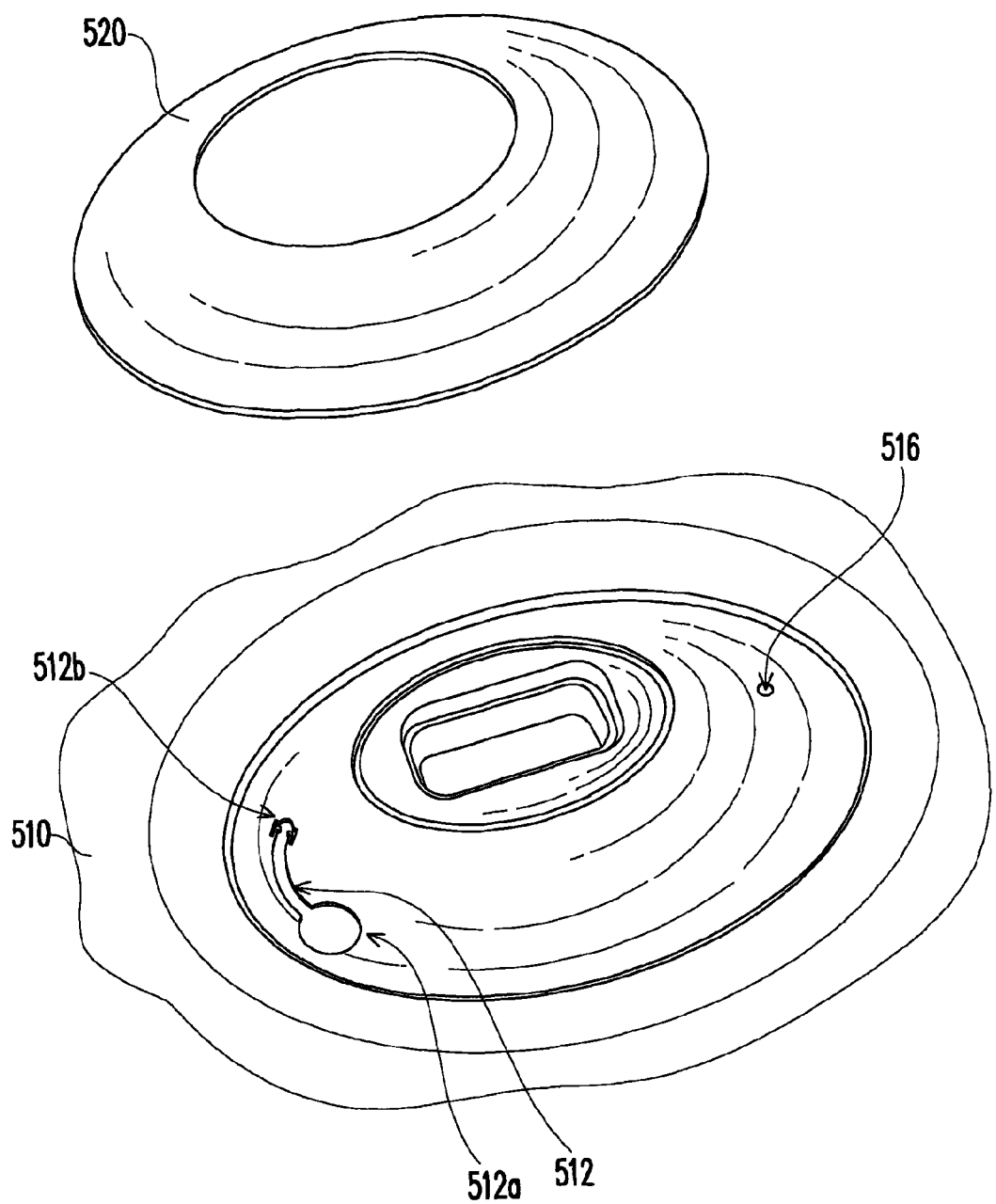
FIG. 7 is an exploded schematic diagram of an apparatus case according to another embodiment of the invention.
Figure 8:
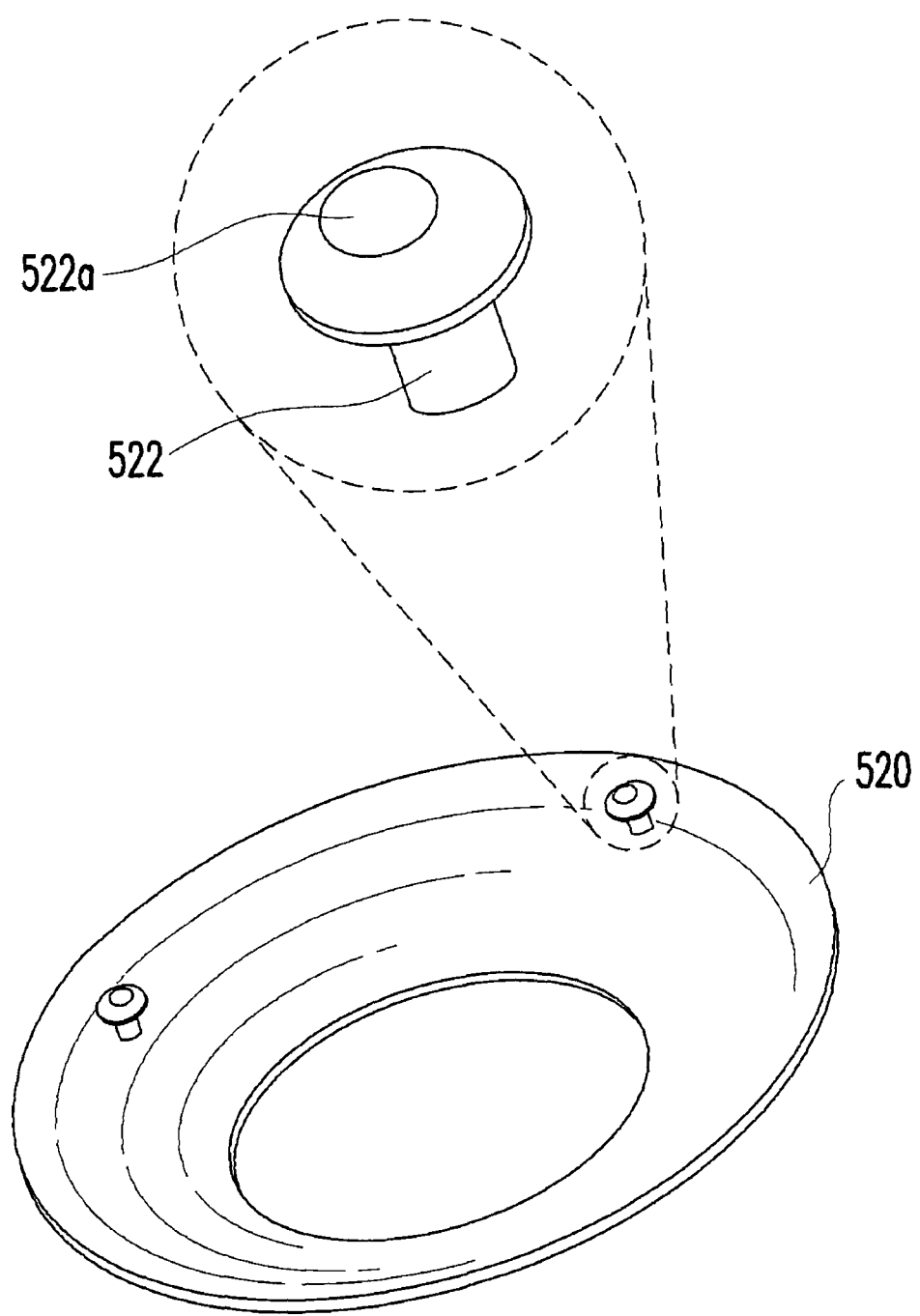
FIG. 8 is a 3-dimensional diagram of the lid of FIG. 7 in another aspect of view.
Figure 9A:
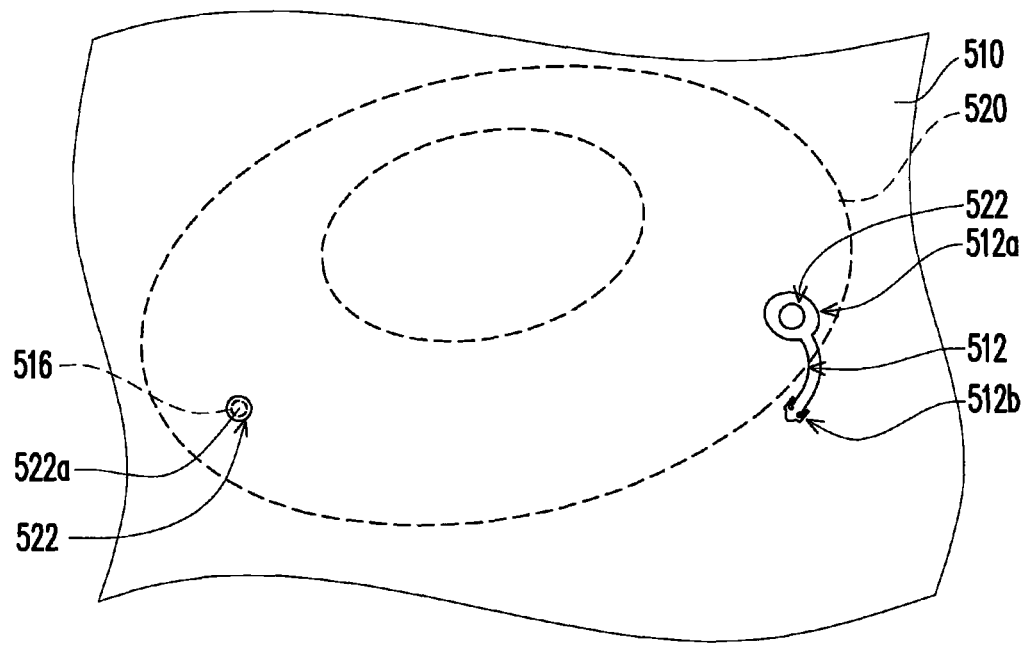
FIG. 9A is a bottom view diagram showing the two positioning pillars of FIG. 7 respectively extend into the slot and an opening.
Figure 9B:
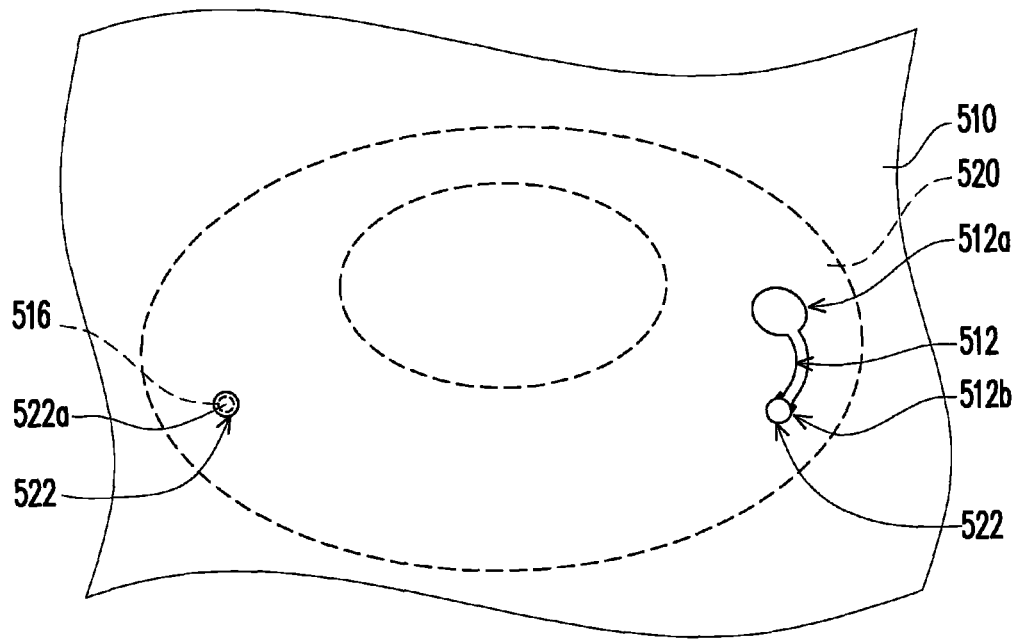
FIG. 9B is a bottom view diagram showing one of the two positioning pillars of FIG. 9A moves to the second end of the corresponding slot.

The invention does not limit the number of the slots 112, referring the following embodiment with diagrams. FIG. 7 is an exploded schematic diagram of an apparatus case according to another embodiment of the invention. Referring to FIGS. 7, 8 and 9A-9B, in an apparatus case 500 of the embodiment, the lid 520 has two positioning pillars 522 disposed on a bottom surface thereof. The main casing 510 has a slot 512 and an opening 516. When the lid 520 covers the main casing 510 and the two positioning pillars 522 respectively extend into the first end 512a of the slot 512 and the opening 516 (as shown by FIG. 9A), the lid 520 could rotate relatively to the main casing 510 around the positioning pillar 522 extending into the opening 516 as a rotation axis so as to bring the other positioning pillar 522 to simultaneously move (as shown by FIG. 9B) along the slot 512 to the second end 512b to be positioned. The way for the positioning pillar 522 to be positioned at the second end 512b is the same as that for the positioning pillar 122 to be positioned at the second end 112b shown in FIG. 6, which is omitted to describe. The outer diameter of the position-limiting portion 522a of the positioning pillar 522 corresponding to the opening 516 is greater than or equal to the diameter of the opening 516, and the position-limiting portion 522a is made of elastic material so that the position-limiting portion 522a could go through the opening 516 by an elastic deformation to limit the position of the positioning pillar 522 at the opening 516, such that the lid 520 is unable to be separated from the main casing 510, which avoids the user to arbitrarily detach the lid 520 from the main casing 510.

In summary, in the above-mentioned embodiments of the invention, when the positioning pillars of the lid respectively and correspondingly extend into the slots of the main casing, only one operation of rotating the lid relatively to the main casing could bring each of the positioning pillars to simultaneously move along the slots and to be positioningly limited by the elastic arms, which makes assembling the apparatus case more convenient. In addition, when the lid follows the above-mentioned operation and is rotated relatively to the main casing to arrive at the target position by assembling, by the position-limiting function of each of the elastic arms on the positioning pillar, the lid is unable to reversely rotate to separate from the main casing, which avoids a user to arbitrarily detach the lid from the main casing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus with locking structure, comprising:
   an apparatus case, comprising a main casing, a lid and at least one locking structure, wherein the locking structure comprises:
   at least one slot and at least one elastic arm both disposed at the main casing, wherein the elastic arm is located in the slot and each the slot has a first end and a second end opposite to the first end; and
   at least one positioning pillar disposed at the lid, wherein when the lid covers the main casing and the positioning pillar correspondingly extends into the first end of the slot, the lid is capable of rotating relatively to the main casing and bringing the positioning pillar to simultaneously move along the corresponding slot to the corresponding second end, and when the positioning pillar is located at the second end, the elastic arm of the corresponding slot makes the positioning pillar being positioningly limited at and lean against the second end for avoiding a separation between the lid and the main casing, wherein the elastic arm has a retaining bump, the positioning pillar is capable of pushing away the retaining bump during moving along the corresponding slot by withstanding an elastic force of the elastic arm so as to move to the second end, and when the positioning pillar is located at the second end, the retaining bump leans against the positioning pillar for preventing the positioning pillar from moving away from the second end along the corresponding slot;
   a light source, disposed in the apparatus case for providing an illumination beam;
   a light valve, disposed in the apparatus case for converting the illumination beam into an image beam; and
   a lens, disposed in the apparatus case for converting the image beam into a projection beam.

2. The projection apparatus with locking structure as claimed in claim 1, wherein the retaining bump has a guiding slope and the positioning pillar pushes away the retaining bump by a guiding function of the guiding slope.

3. The projection apparatus with locking structure as claimed in claim 1, wherein the number of the at least one elastic arm is two and the two elastic anus extend out respectively from two opposite inner walls of the slot.

4. The projection apparatus with locking structure as claimed in claim 1, wherein the number of the at least one slot is two, the number of the at least one positioning pillar is two, the number of the elastic arm is multiple and the elastic arms are respectively located in the two slots, when the lid covers the main casing and the two positioning pillars respectively and correspondingly extend into the two first ends, the lid is capable of rotating relatively to the main casing and bringing each of the positioning pillars to simultaneously move along the corresponding slot to the corresponding second end, and when the two positioning pillars are respectively located at the two second ends, the elastic anus of the two slots respectively make the two positioning pillars being positioningly limited at the two second ends for avoiding the separation between the lid and the main casing.

5. The projection apparatus with locking structure as claimed in claim 4, wherein the two slots are arc-shaped and respectively have a corresponding curvature center and two curvature radii of the two slots are of the same length.

6. The projection apparatus with locking structure as claimed in claim 1, wherein the positioning pillar has a position-limiting portion disposed in one end thereof, an inner diameter of the first end of the slot is greater than or equal to an outer diameter of the position-limiting portion and the inner diameter of the second end of the slot is less than the outer diameter of the position-limiting portion.

7. The projection apparatus with locking structure as claimed in claim 1, wherein the main casing has a groove, the slot is formed at a bottom surface of the groove and the lid is embedded in the groove of the main casing.

8. The projection apparatus with locking structure as claimed in claim 1, wherein the number of the at least one slot is one, the number of the at least one positioning pillar is two, the locking structure further comprises an opening disposed at the main casing, when the lid covers the main casing and the two positioning pillars respectively extend into the first end of the slot and the opening, the lid is capable of rotating relatively to the main casing around the positioning pillar extending into the opening as an axis so as to bring the other positioning pillar to simultaneously move along the slot to the second end and the elastic arm positioningly limits the corresponding positioning pillar at the second end of the slot.

9. A projection apparatus with locking structure, comprising:
   an apparatus case, comprising a main casing, a lid and at least one locking structure, wherein the locking structure comprises:
   at least one slot and at least one elastic arm both disposed at the main casing, wherein the elastic arm is located in the slot and each the slot has a first end and a second end opposite to the first end; and
   at least one positioning pillar disposed at the lid, wherein when the lid covers the main casing and the positioning pillar correspondingly extends into the first end of the slot, the lid is capable of rotating relatively to the main casing and bringing the positioning pillar to simultaneously move along the corresponding slot to the corresponding second end, and when the positioning pillar is located at the second end, the elastic arm of the corresponding slot makes the positioning pillar being positioningly limited at and lean against the second end for avoiding a separation between the lid and the main casing, wherein the positioning pillar has a position-limiting portion disposed in one end thereof, an inner diameter of the first end of the slot is greater than or equal to an outer diameter of the position-limiting portion and the inner diameter of the second end of the slot is less than the outer diameter of the position-limiting portion;
   a light source, disposed in the apparatus case for providing an illumination beam;
   a light valve, disposed in the apparatus case for converting the illumination beam into an image beam; and
   a lens, disposed in the apparatus case for converting the image beam into a projection beam.

10. The projection apparatus with locking structure as claimed in claim 9, wherein the number of the at least one elastic arm is two and the two elastic arms extend out respectively from two opposite inner walls of the slot.

11. The projection apparatus with locking structure as claimed in claim 9, wherein the number of the at least one slot is two, the number of the at least one positioning pillar is two, the number of the elastic arm is multiple and the elastic arms are respectively located in the two slots, when the lid covers the main casing and the two positioning pillars respectively and correspondingly extend into the two first ends, the lid is capable of rotating relatively to the main casing and bringing each of the positioning pillars to simultaneously move along the corresponding slot to the corresponding second end, and when the two positioning pillars are respectively located at the two second ends, the elastic arms of the two slots respectively make the two positioning pillars being positioningly limited at the two second ends for avoiding the separation between the lid and the main casing.

12. The projection apparatus with locking structure as claimed in claim 11, wherein the two slots are arc-shaped and respectively have a corresponding curvature center and two curvature radii of the two slots are of the same length.

13. The projection apparatus with locking structure as claimed in claim 9, wherein the main casing has a groove, the slot is formed at a bottom surface of the groove and the lid is embedded in the groove of the main casing.

14. The projection apparatus with locking structure as claimed in claim 9, wherein the number of the at least one slot is one, the number of the at least one positioning pillar is two, the locking structure further comprises an opening disposed at the main casing, when the lid covers the main casing and the two positioning pillars respectively extend into the first end of the slot and the opening, the lid is capable of rotating relatively to the main casing around the positioning pillar extending into the opening as an axis so as to bring the other positioning pillar to simultaneously move along the slot to the second end and the elastic arm positioningly limits the corresponding positioning pillar at the second end of the slot.

* * * * *